(12) United States Patent
Dutta et al.

(10) Patent No.: US 12,047,932 B2
(45) Date of Patent: Jul. 23, 2024

(54) SIDELINK RESOURCE SELECTION WITH ASSISTING DEVICE USAGE AWARENESS

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Junyi Li, Fairless Hills, PA (US); Navid Abedini, Basking Ridge, NJ (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/456,082

(22) Filed: Nov. 22, 2021

(65) Prior Publication Data
US 2023/0164766 A1 May 25, 2023

(51) Int. Cl.
*H04W 72/12* (2023.01)
*H04L 5/14* (2006.01)

(52) U.S. Cl.
CPC ............... *H04W 72/12* (2013.01); *H04L 5/14* (2013.01)

(58) Field of Classification Search
CPC .................................. H04W 72/12; H04L 5/14
USPC ........................................................... 370/329
See application file for complete search history.

(56) References Cited

U.S. PATENT DOCUMENTS

2019/0387377 A1* 12/2019 Zhang ................. H04W 52/383
2023/0122731 A1*  4/2023 Dutta .................... H04W 72/51
                                                              370/329

* cited by examiner

*Primary Examiner* — Angel T Brockman
(74) *Attorney, Agent, or Firm* — Arun Swain

(57) ABSTRACT

This disclosure provides systems, devices, apparatus, and methods, including computer programs encoded on storage media, for sidelink resource selection with AD usage awareness. A UE may receive, from one or more ANs, one or more resource usage schedules associated with one or more ADs in communication with the one or more ANs. The UE may combine the one or more resource usage schedules associated with the one or more ADs into a combined resource usage schedule. The usages may be associated with the combined resource usage schedule, which may be indicative of excluded resources for a transmission of the UE. The UE may transmit, based on the combined resource usage schedule, the transmission of the UE on a resource other than the excluded resources.

30 Claims, 14 Drawing Sheets

| Slot Index | N | N+1 | N+2 | N+3 | N+4 | N+5 | N+6 | N+7 |
|---|---|---|---|---|---|---|---|---|
| AD Active | $R_1$ | $R_2, R_3$ | 0 | $R_1, R_2$ | $R_1, R_2$ | $R_1$ | 0 | $R_2, R_3$ |

800

| Slot Index | N | N+1 | N+2 | N+3 | N+4 | N+5 | N+6 | N+7 |
|---|---|---|---|---|---|---|---|---|
| Activity Active | 1 | 2 | 0 | 4 | 4 | 1 | 0 | 2 |

SIDELINK RESOURCE SELECTION WITH ASSISTING DEVICE USAGE AWARENESS

TECHNICAL FIELD

The present disclosure relates generally to communication systems, and more particularly, to sidelink resource selection with assisting device usage awareness.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from one or more assisting nodes (ANs), one or more resource usage schedules associated with one or more assisting devices (ADs) in communication with the one or more ANs; combine the one or more resource usage schedules associated with the one or more ADs into a combined resource usage schedule, usages associated with the combined resource usage schedule indicative of excluded resources for a transmission of the UE; and transmit, based on the combined resource usage schedule, the transmission of the UE on a resource other than the excluded resources.

In another aspect of the disclosure, a method, a computer-readable medium, and an apparatus are provided. The apparatus may receive, from at least one user equipment (UE) of a group of UEs, a resource usage request associated with one or more assisting devices (ADs) in communication with the AN; update one or more resource usage schedules based on the resource usage request, the one or more resource usage schedules being associated with the one or more ADs in communication with the AN; and transmit, to one or more of the group of UEs, an indication of the updated one or more resource usage schedules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 includes tables indicative of usage schedules for one or more ADs.

DETAILED DESCRIPTION

Figure 1:
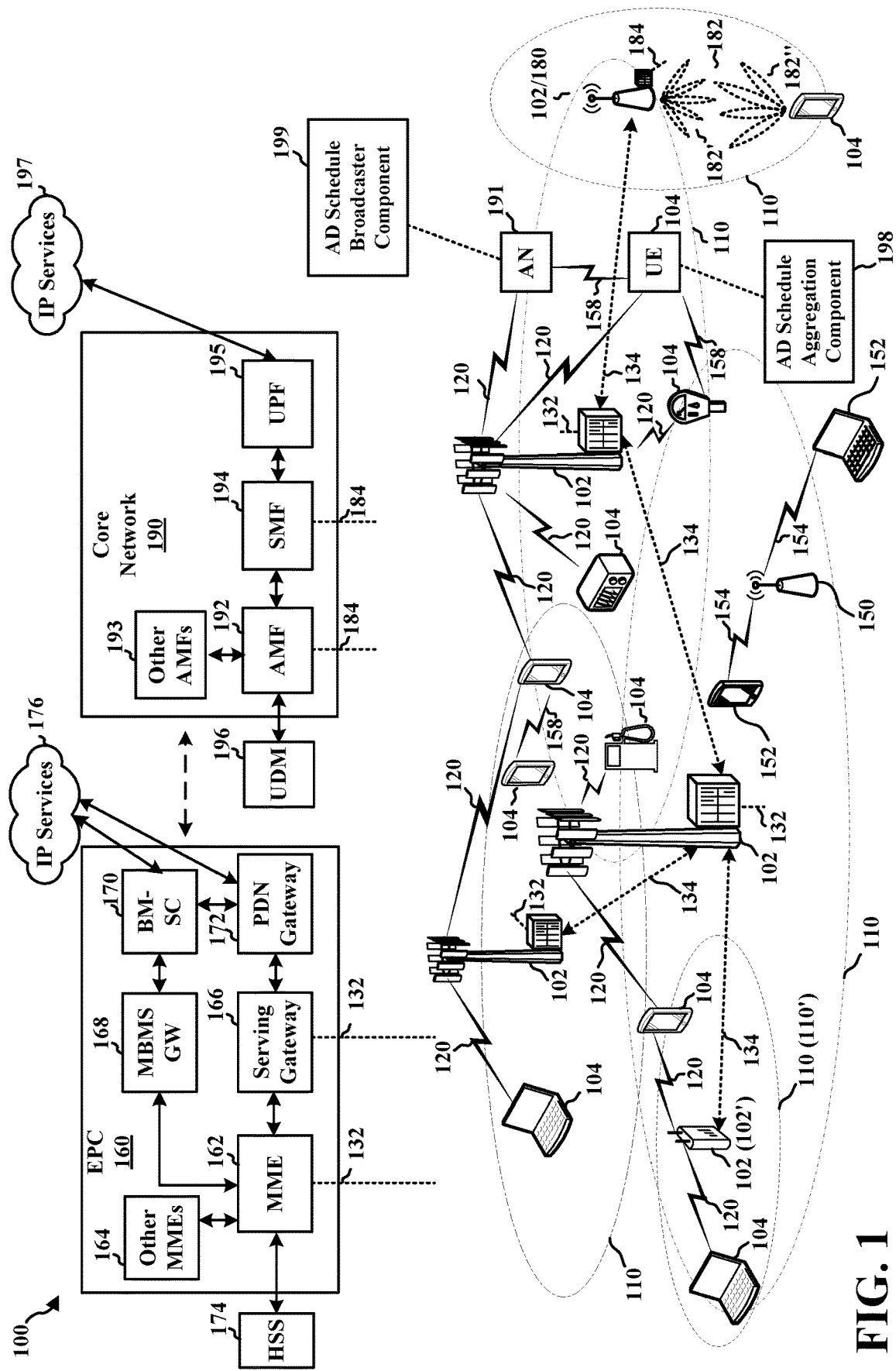
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an assisting device (AD) schedule aggregation component 198 configured to receive, from one or more assisting nodes (ANs), one or more resource usage schedules associated with one or more ADs in communication with the one or more ANs; combine the one or more resource usage schedules associated with the one or more ADs into a combined resource usage schedule, usages associated with the combined resource usage schedule indicative of excluded resources for a transmission of the UE; and transmit, based on the combined resource usage schedule, the transmission of the UE on a resource other than the excluded resources. An AN 191 may be in communication with the UE 104 via the D2D communication link 158 and/or in communication with the base station 102 via the communication link 120. In certain aspects, the AN 191 may include an AD schedule broadcaster component 199 configured to receive, from at least one user equipment (UE) of a group of UEs, a resource usage request associated with one or more assisting devices (ADs) in communication with the AN; update one or more resource usage schedules based on the resource usage request, the one or more resource usage schedules being associated with the one or more ADs in communication with the AN; and transmit, to one or more of the group of UEs, an indication of the updated one or more resource usage schedules. Although the following description may be focused on 5G NR, the concepts described herein may be applicable to other similar areas, such as LTE, LTE-A, CDMA, GSM, and other wireless technologies.

Figure 2:
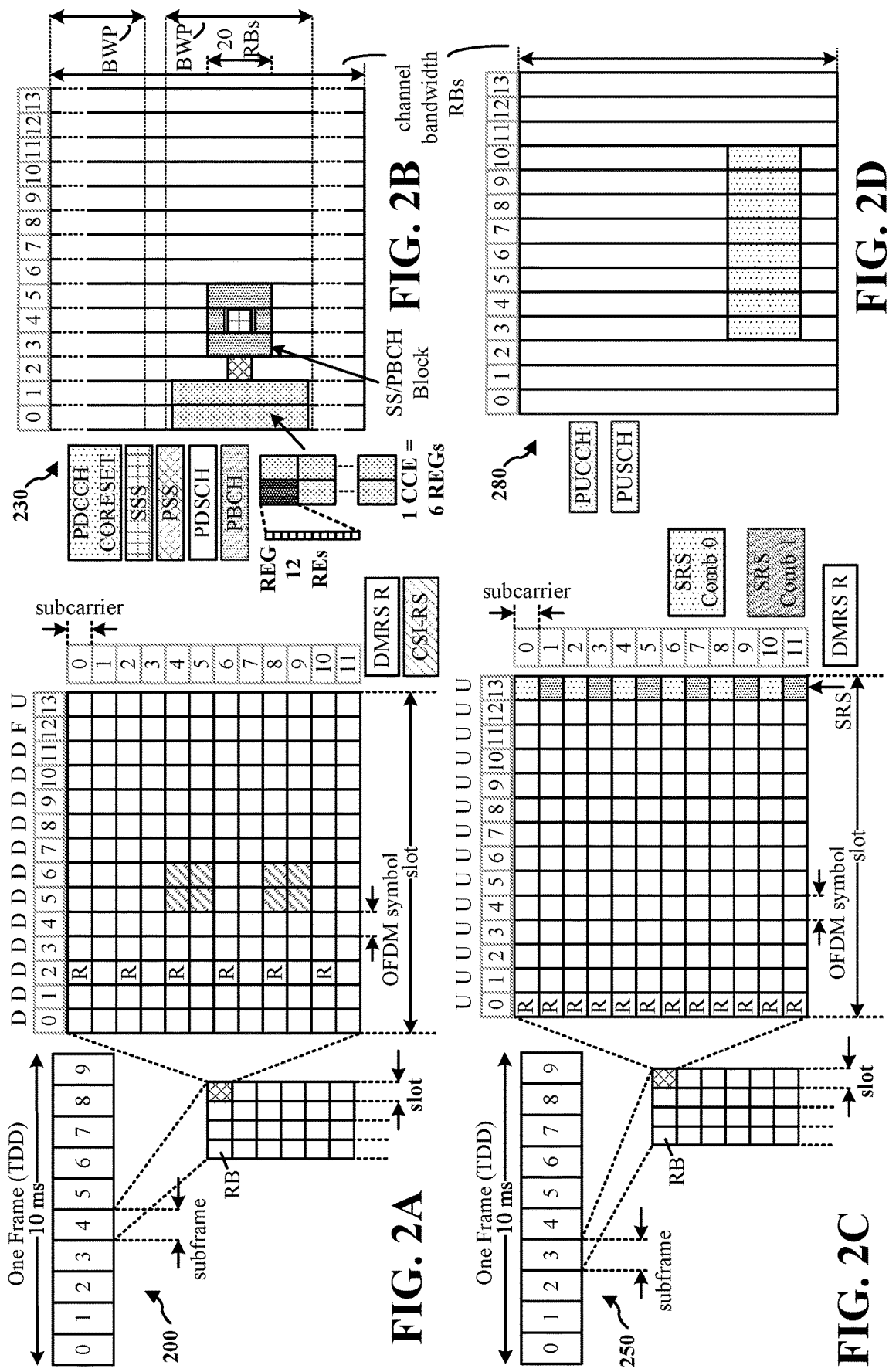
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
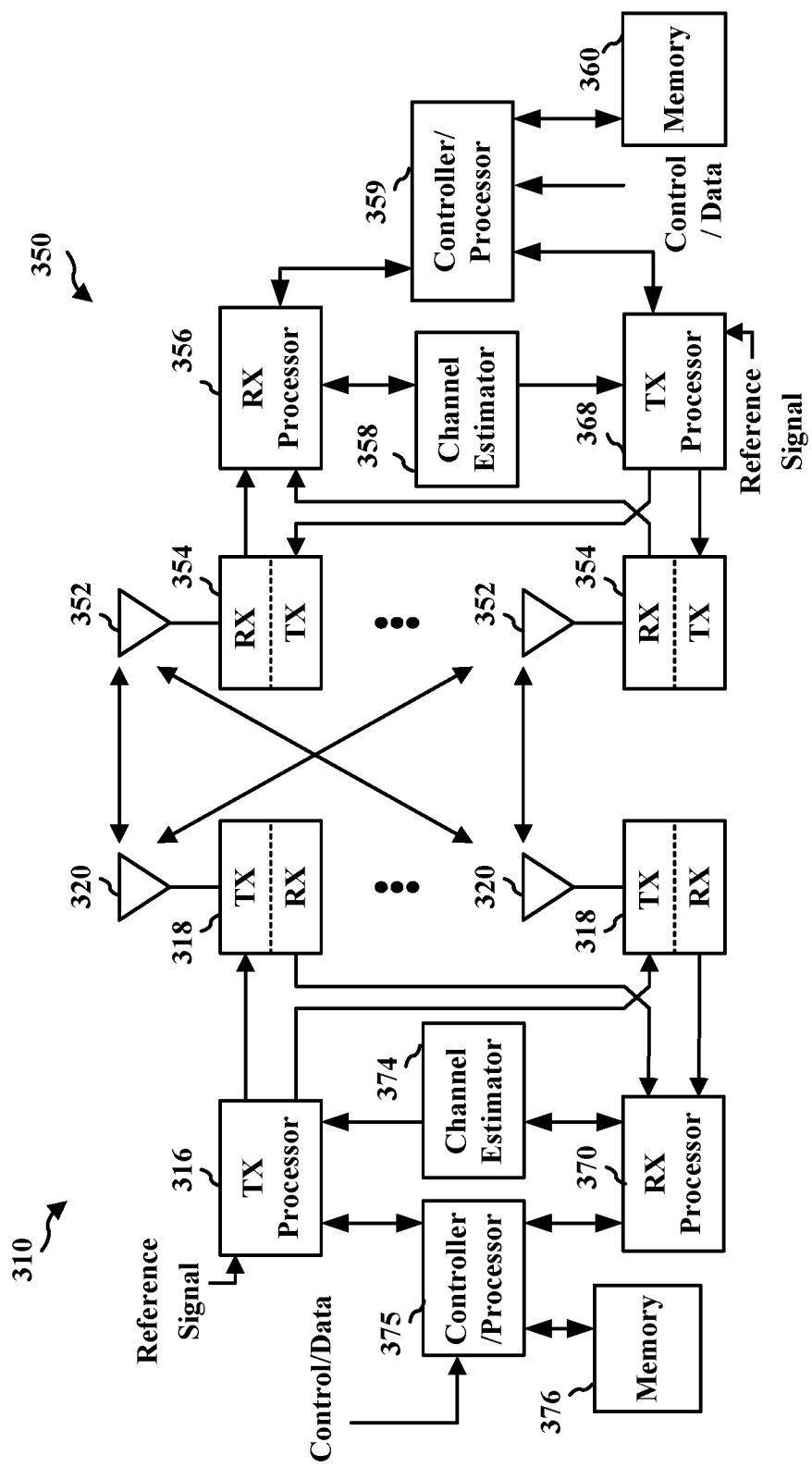
FIG. 3 is a diagram illustrating an example of an assisting node (AN) and user equipment (UE) in an access network.

FIG. 3 is a block diagram of a AN 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the AN 310. These soft decisions may be based on channel estimates computed by the channel estimator 358. The soft decisions are then decoded and deinterleaved to recover the data and control signals that were originally transmitted by the AN 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the AN 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the AN 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the AN 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the AD schedule aggregation component 198 of FIG. 1.

At least one of the TX processor 316, the RX processor 370, and the controller/processor 375 may be configured to perform aspects in connection with the AD schedule broadcaster component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
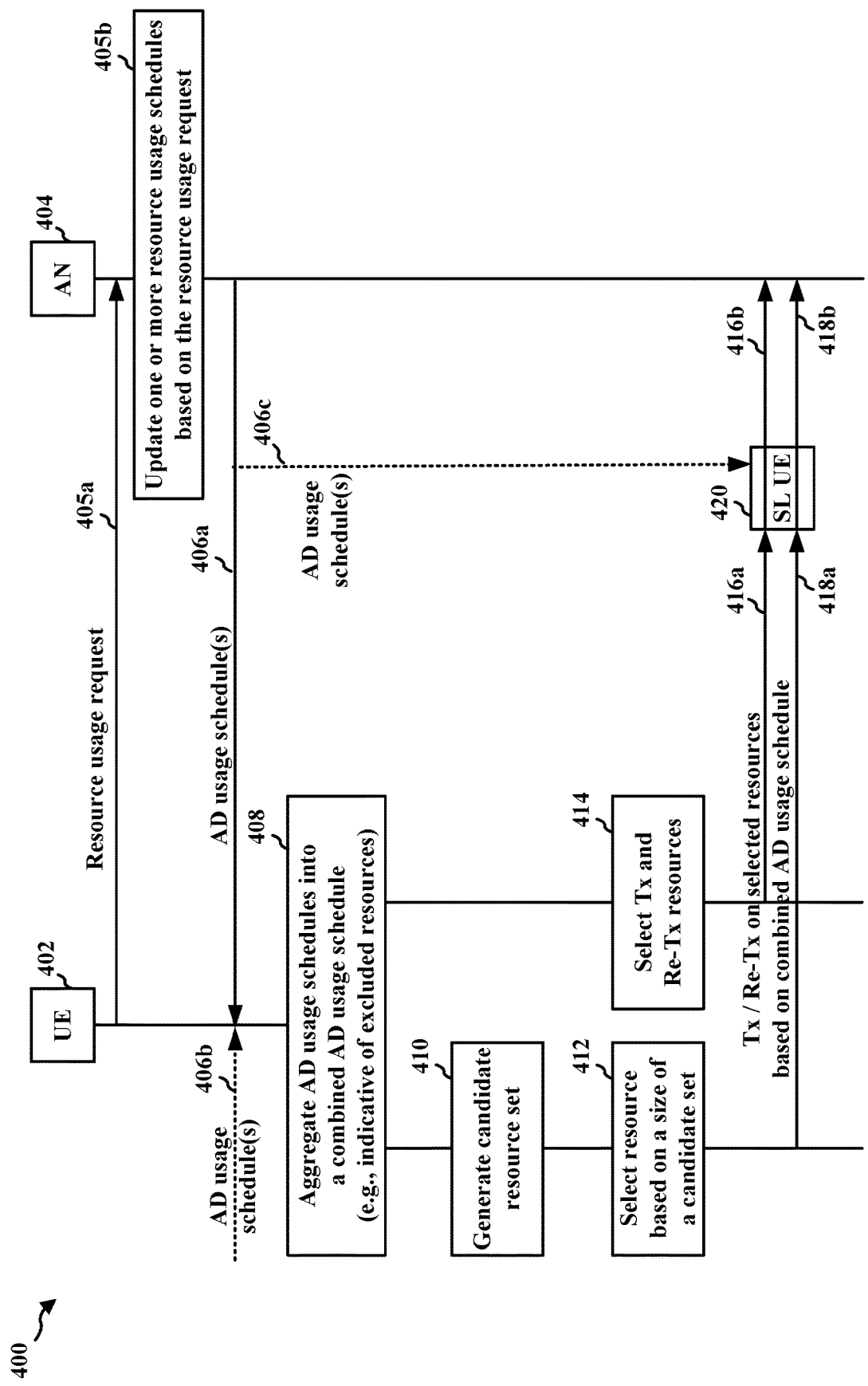
FIG. 4 is a call flow diagram illustrating communications between a UE and an AN.

FIG. 4 is a call flow diagram 400 illustrating communications between a UE 402 and an AN 404. At 405a, the UE 402 may transmit, to the AN 404, a resource usage request associated with one or more ADs in communication with the AN, where the one or more resource usage schedules may be received based on a resource usage request. Likewise, at 405a, the AN 404 may receive, from at least one UE (e.g., UE 402) of a group of UEs, a resource usage request associated with one or more ADs in communication with the AN. At 405b, the AN 404 may update one or more resource usage schedules based on the resource usage request, the one or more resource usage schedules being associated with the one or more ADs in communication with the AN. At 406a, AN 404 may transmit, to one or more of a group of UEs (e.g., UE 402), an indication of the updated one or more resource usage schedules. At 406a, the UE 402 may receive AD usage schedule(s) from the AN 404 indicative of times at which the associated ADs are in use by other UEs. The UE 402 may also receive, at 406b, AD usage schedule(s) from one or more other ANs in the network. Similarly, the AN 404 may transmit, at 406c, the AD usage schedule(s) to one or more other UEs in the network, such as the sidelink UE 420.

At 408, the UE 402 may aggregate the AD usage schedule(s) received, at 406a, from the AN 404 and/or received, at 406b, from the one or more other ANs in the network into a combined AD usage schedule. The combine AD usage schedule may be indicative of excluded resources that the UE 402 may avoid for transmissions of the UE 402. At 414, the UE 402 may select transmission (Tx) resources and retransmission (Re-Tx) resources for the transmissions of the UE 402 based on the combined AD usage schedule aggregated, at 408. Alternatively, the UE 402 may generate, at 410, a candidate set of resources for the transmissions of the UE 402. The UE 402 may select, at 412, resources for the transmission of the UE 402 based on a size of the candidate resource set.

At 416a, the UE 402 may perform a transmission/retransmission on the resources selected, at 414, based on the combined AD usage schedule. Similarly, at 418a, the UE 402 may alternatively perform a transmission/retransmission on the resources selected, at 412, based on the combined AD usage schedule. The transmission/retransmission from the UE 402 may be received, at 416a and 418a, by other UEs in the network, such as the sidelink UE 420, or may be received, at 416b and 418b, one or more ANs included in the network, such as the AN 404.

Figure 5:
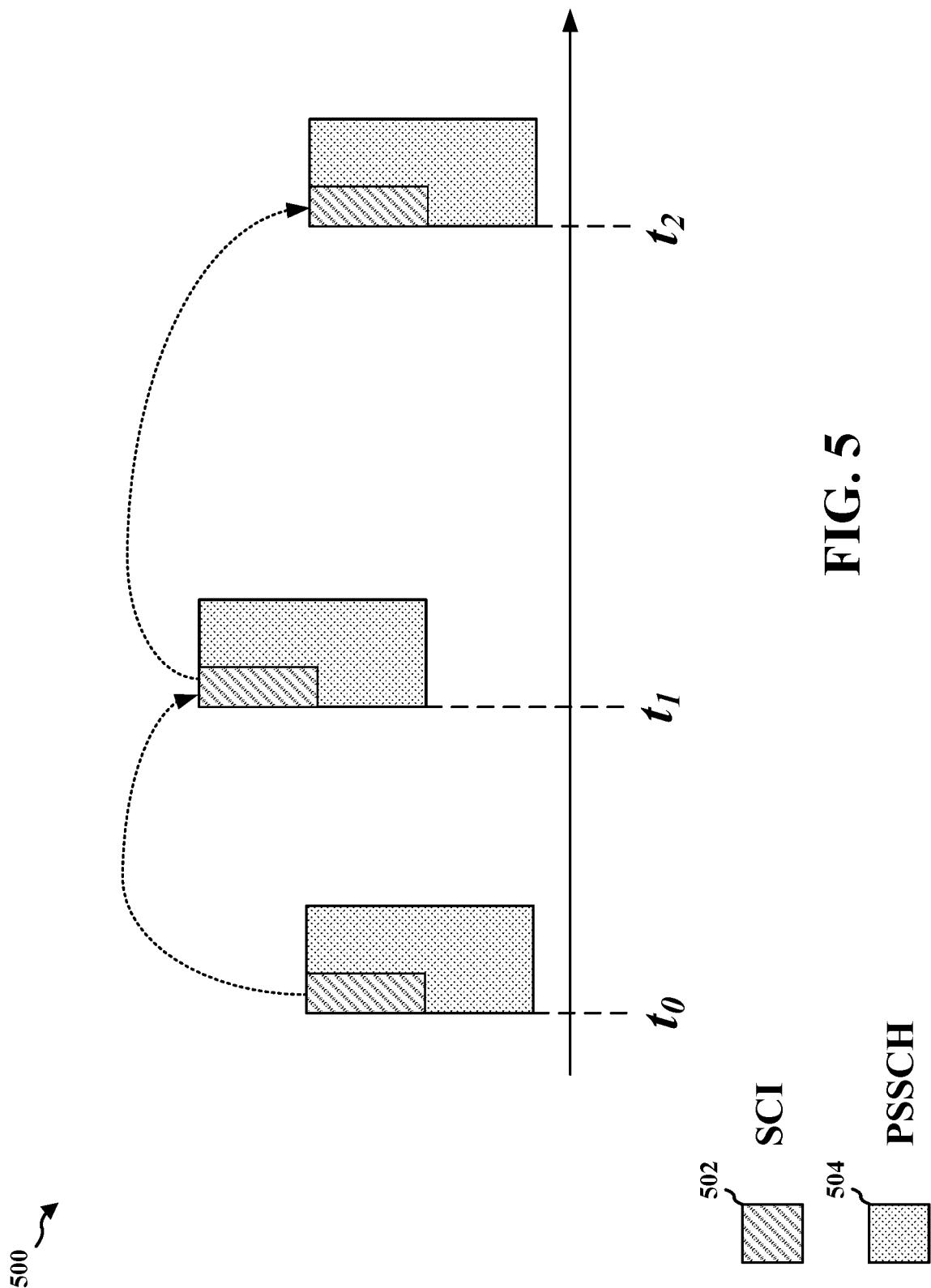
FIG. 5 is a diagram illustrating a resource selection and reservation technique for sidelink communication.

FIG. 5 is a diagram 500 illustrating a resource selection and reservation technique for sidelink communication. For example, the diagram 500 may be associated with mode 2 sidelink communication, which may correspond to a distributed network of sidelink UEs. That is, a central entity, such as a base station, may not be utilized to schedule communications of the sidelink UEs. Instead, the sidelink UEs sense the channel and transmit signals via sidelink based on the sensing information. The sidelink UEs may sense the channel, in some examples, based on a reference signal received power (RSRP) of a received sidelink control channel. In some examples, a sidelink UE may transmit a data packet together with a control message, such that the UE may not communicate based on a separate control channel from the control message. That is, the control channel may be transmitted together with the data pack, which may be different from Uu link configurations where the base station may transmit a standalone DCI.

Sidelink control information (SCI) 502 in the diagram 500 transmitted together with a data packet (e.g., corresponding to a physical sidelink shared channel (PSSCH) 504) may indicate both current and/or and future resource reservations. Each of the sidelink UEs may measure the RSRP over the SCI 502, so that the reserved resources may be excluded from a candidate set of resources for transmission. If SCI 502 is received that indicates a particular resource is being used at a present time or at a future time, and the UE receives a higher RSRP in association with the particular resource, a transmission by the UE on such resources may generate an increased amount of interference. Thus, the UE may exclude the particular resource from the candidate resource set based on the RSRP.

A UE that transmits a packet based on channel sensing information may select a resource for initial transmission and one or more resources for possible retransmission(s), as illustrated in the diagram 500. Channel sensing may be performed by each UE when each UE is not transmitting a signal. For example, a sidelink UE may sense the channel for a packet even if the sidelink UE is not expecting to receive anything, so that the sidelink UE may decode the SCI 502 and determine future resource reservations of other sidelink UEs.

If the received power varies significantly for different transmissions, sensing-based resource exclusion procedures may be inaccurate. For example, if at $t=t_0$, a first transmission is received with an RSRP of −100 dBm and a second transmission of the packet, scheduled using the first transmission (at $t=t\_1$) is received with an RSRP of −80 dBm, the receiving UE may determine that the interference is weak enough to schedule overlapping resources (e.g., that collide with each other) at $t=t_1$. However, an increased number of collisions may decrease a reliability associated with both a first packet that previously reserved the resource and a second packet transmitted on the resource.

Figure 6:
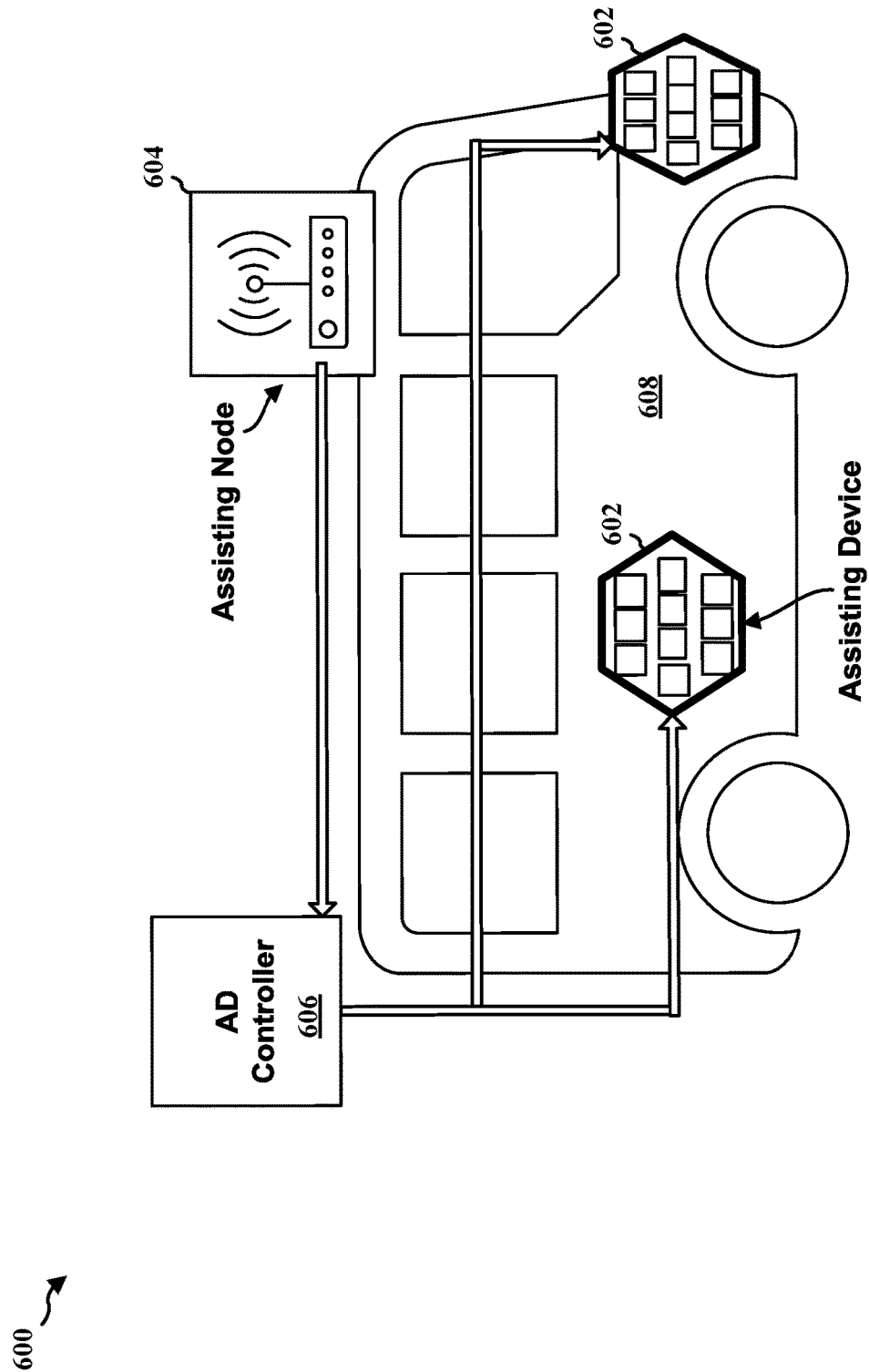
FIG. 6 is a diagram illustrating communications between an AN and one or more assisting devices (ADs).

FIG. 6 is a diagram 600 illustrating communications between an AN 604 and one or more ADs 602. The one or more ADs 602 may correspond to a relay, a repeater, a reconfigurable intelligent surfaces (RIS), a meta-surface, etc. The one or more ADs 602 may be configured to boost a signal strength received from an associated device, such as a first sidelink UE, and/or steer a received signal in a particular direction, such as toward a second sidelink UE. In examples, a relay may include an amplifier and forwarding component to provide the signal to the second sidelink UE or in a general direction that improves the communication, such as toward a RIS. The one or more ADs 602 may modulate signal phases on the RIS for steering the beam in the particular direction. The one or more ADs 602 may be controlled by the AN 604, which may include Uu and/or sidelink communication capabilities with other devices. The AN 604 may communicate with other communication nodes, such as sidelink UEs, a base station, etc., to determine a configuration for the one or more ADs 602.

The vehicle 608 included in the diagram 600 may include one or more ADs 602 that correspond to a first RIS and a second RIS in communication with the AN 604, where the AN 604 may be capable of performing both Uu and sidelink communications. The AN 604 may receive over-the-air (OTA) messages or control information to determine amplification factor, phase shifts, beam configuration, etc., for the one or more ADs 602 that may improve transmissions for a communication link, the network, or a locality of the network. The AN 604 may be connected to a base station, one or more sidelink UEs, etc., and based on exchanged communications with such devices, the AN 604 may control the configuration of the one or more ADs 602 at a plurality of time instances. For example, the AN 604 may switch the one or more ADs 602 from a first configuration to a second configuration based on information transmitted to an AD controller 606. The AD controller 606 may be a microcontroller, a microprocessor, etc., that may adjust one or more configuration parameters of the one or more ADs 602 to change the configuration of the one or more ADs 602 based on changes to the communication channel and/or other changes in communication conditions.

Resource exclusion techniques for mode 2 systems may have decreased reliability in cases where sidelink UEs exchange communications via one or more ADs 602. For example, the one or more ADs 602 may change the received power for different retransmissions, such that differences in the received power of the different retransmissions may vary significantly enough to cause an over exclusion of resources or an increased number of resource collisions. In an example, if a first transmission occurs at $t=t_0$ and the AN 604 determines that communications may be improved based on boosting the signal power at $t=t_1$, the different transmissions may be received by the UE with different received powers, which may cause resource exclusion techniques to be less reliable.

Figure 7:
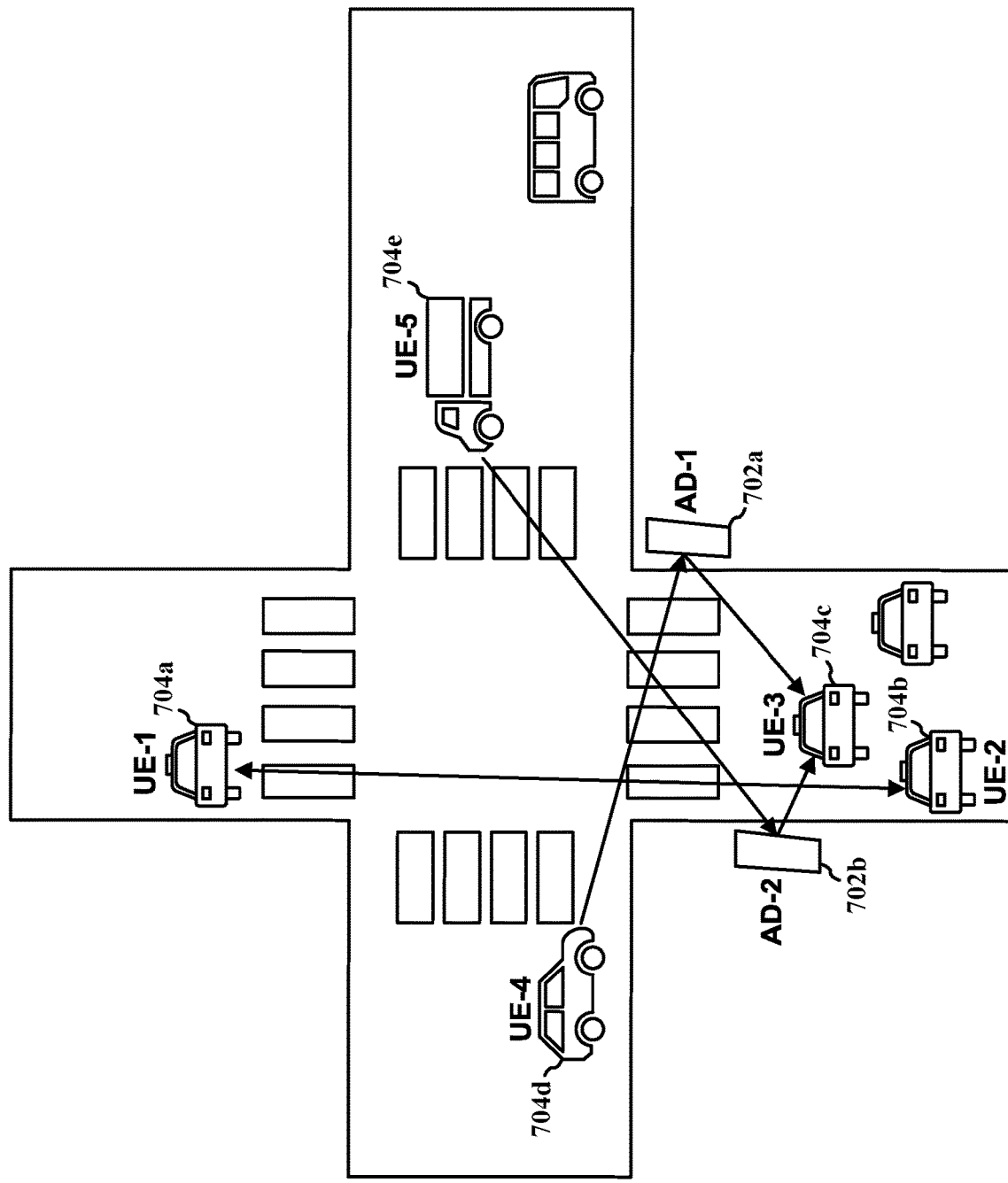
FIG. 7 is a diagram illustrating sidelink communications in a communication environment that includes one or more ADs.

FIG. 7 is a diagram 700 illustrating sidelink communications in a communication environment that includes one or more ADs 702a-702b. A first UE 704a and a second UE 704b may communicate via sidelink (e.g., without assistance from the one or more ADs 702a-702b). A third UE 704c in proximity to the second UE 704b may communicate with a fourth UE 704d via a first AD 702a and/or communicate a fifth UE 704e via a second AD 702b. In transmission slots where the first AD 702a and/or the second AD 702b are active (e.g., switched on), a transmission from the first UE 704a to the second UE 704b may have a higher received power at the third UE 704c and other nearby UEs than when the first AD 702a and the second AD 702b are inactive (e.g., switched off) or used for a link that does not interfere with the transmission between UE 704a and UE 704b.

While activation of the one or more ADs 702a-702b may improve communications of the third UE 704c, the first UE 704a and the second UE 704b may have a direct communication link that may not have to be boosted by the first AD 702a or the second AD 702b. However, the direct communication link between the first UE 704a and the second UE 704b may still be impacted by the activation of the first AD 702a or the second AD 702b. For example, the one or more ADs 702a-702b may operate based on control signals from the assisting node (AN). The AN may not be capable of determining which of the UEs included in the communication environment may be impacted by the boosted or steered signal. UEs with a poor or degraded link, e.g., UE 704c and UE 704d, may establish a link with one or more ANs in the network to aid or assist in the transmissions. For example, this may be performed using a discovery procedure for an AN and AD. A link between the one of more such UEs and the ANs may be established for over-the-air (OTA) control of the ADs via the AN. Links which already meet quality of service (QoS) requirements may not need to perform this step and directly communicate without the AN, e.g., UE 704a and UE 704b.

Even though the first AD 702a and the second AD 702b are not being controlled to improve the direct communication link between the first UE 704a and the second UE 704b, activation of the first AD 702a or the second AD 702b may change a signal quality of the direct communication link. In an example, the first UE 704a may reserve a resource at time $T_1$ while the one or more ADs 702a-702b are switched off. The resource reservation may be received at the third UE 704c with a first RSRP=$\gamma_1$. The third UE 704c may exclude the reserved resource at time $T_2$ based on the first RSRP. At time $T_2$, if the first AD 702a and/or the second AD 702b is switched on, the power received from the first UE 704a at the third UE 704c may be significantly different than $\gamma_1$. The difference in the received powers may cause unreliable resource exclusions to occur at the third UE 704c. For example, the third UE 704c may either over exclude resources or reserved resources with an increased chance of collisions. Sidelink resource selection and reservation techniques based on AD usage awareness may improve the reliability of sidelink communications in a distributed network.

If the one or more ADs 702a-702b are controlled by a same AN, the AN may determine usage schedules for the one or more ADs 702a-702b. The AN may broadcast the usage schedules of the one or more ADs 702a-702b into the communication environment at a certain periodicity. The usage schedules of the one or more ADs 702a-702b may include at least a time for which the one or more ADs 702a-702b are active/switched on. The usage schedules may also be broadcast at T slots before the usage schedules begin, where T may be a predetermined number of slots.

The sidelink UEs may receive the usage schedules from one or more ANs 702a-702b in proximity to the sidelink UEs. The sidelink UEs may aggregate/combine the received usage schedules into a combined usage schedule. For the time period that corresponds to the combined usage schedule, resource exclusion and selection may be performed based on the combined usage schedule associated with the one or more ADs 702a-702b. The combined usage schedule may be used to improve resource exclusion techniques and increase reliability.

FIG. 8 includes tables 800-850 indicative of usage schedules for one or more ADs. The usage schedules may be indicated to the PHY layer from an upper layer. The upper layer may perform an aggregation of the AD usage schedules for one or more UEs. An application layer (e.g., a vehicle-to-everything (V2X) application layer or a D2D application layer) may aggregate/combine the AD usage schedules after receiving the AD usage schedules from one or more ANs, and notify lower layers of patterns in the AD usage schedules. The patterns may be indicative of future slots/subframes that correspond to the AD usage schedules and other information associated with the ADs that are active on the future slots/subframes. For example, a TDD pattern may correspond to $R_1$, $R_2$, $R_3$, which may be indicative of the ADs that are active.

Based on the tables 800-850, the upper layer may transmit the TDD pattern for slots N to N+7. In the table 800, $R_1$ is active individually in slots N and N+5, $R_2$ and $R_3$ are active in slots N+1 and N+7, $R_1$ and $R_2$ are active in slots N+3 and N+4, and none of the ADs are active in slots N+2 and N+6. In the table 850, the TDD pattern of the application layer may indicate an index to be used for PHY layer resource partition/selection. Thus, rather than indicating to the PHY layer the specific ADs that are active, each index value included in the table 850 may indicate that a same set of ADs corresponding to the index value are active. For example, index value 1 may indicate that AD1 and AD2 are active in each slot that includes index value 1, index value 2 may indicate that AD1 and AD3 are active in each slot that includes index value 2, etc. In the table 850, slots N and N+5 include index value 1 corresponding to a first set of one or more ADs, slots N+1 and N+7 include index value 2 corresponding to a second set of one or more ADs, and slots N+3 and N+4 include index value 4 corresponding to a third set of one or more ADs. Index value zero included in slots N+2 and N+6 may indicate that none of the ADs are active.

The application layer may also indicate information, such as directional usage information for the one or more ADs, whether the one or more ADs are used for a forward link or a reverse link, a zone identifier (ID) or cell ID associated with the transmissions, etc. In examples, directional information and usage information may be separately indicated. That is, a first TDD pattern may be indicative of the usage indication and a second TDD pattern may be indicative of the directional information. In further examples, the directional information may be combined with the usage information (e.g., AD usage schedules) to determine the TDD pattern. Thus, two ADs serving a same direction/location may be used to determine the TDD pattern.

The usage schedule indicated via the TDD pattern may be transmitted to the lower layer and may include, or may be generated based on, the RSRP measured over the message received from the AN, the location of the AN, etc. Signals received from nearby nodes may be assigned increased priority, such that the upper layer may exclude TDD patterns or directional information received from nodes that are farther away. The application layer may provide the AD usage schedule/pattern periodically to the lower layers (e.g., RRC layer, etc.). In example, the periodicity may be fixed based on a predefined protocol for transmitting the AD usage pattern/schedule to the lower layers.

In a first aspect for AD aware resource exclusion and selection, a sidelink MAC may select a first resource for a first transmission and one or more additional resources for retransmissions of a packet. If a TDD pattern for AD usage is indicated to the MAC from the upper layers, the MAC may determine a candidate resource set based on an RSRP threshold ($\gamma_t$) and an available resources threshold (x). If a size of the candidate resource set<x×a size of an entire resource set for a selection window, the total selected resources may be set to $N_t=0$, and increase the RSRP threshold by a known step size $\Delta$, such that $\gamma_{t+1} \rightarrow \gamma_t + \Delta$ (dB).

If the candidate resource set≥x×the size of the entire resource set for a selection window, the MAC may select the first resource for the first transmission from the candidate resource set (e.g., based on $N_t=1$) and determine the AD usage configuration for the selected resource of the first transmission. For instance, the first transmission resource may correspond to an AD usage index=2. Further, the MAC may determine resources from the candidate resource set that correspond to the determined AD usage index. If N retransmission resources are available, the N retransmission resources may be selected from the candidate resource set (e.g., based on $N_t=N_t+N$), where $N_t$ corresponds to the total number of resources. If N retransmission resources are not available, resources corresponding to the AD usage index/configuration may be removed from the candidate resource set, and the MAC may select a different AD configuration (e.g., based on selecting a different resource for the first transmission, determining the AD usage, etc.).

If N+1 resources are available for transmission based on $N_t=N+1$, the MAC may end the AD aware resource exclusion and selection procedure and transmit on the resources.

If N+1 resources are not available for transmission based on $N_t=N+1$, the RSRP threshold may be increased based on a predetermined protocol, such as $\gamma_{t+1} \rightarrow \gamma_t + \Delta$ (dB), and the MAC may again determine the candidate resource set (e.g., a second candidate resource set). Accordingly, each transmission and retransmission of a packet may correspond to a same AD usage index or a same TDD pattern.

In a second aspect for AD aware resource exclusion and selection, the MAC may receive a TDD pattern for AD usage from the upper layers and determine one or more AD configurations/indexes based on additional information, such as a potential RSRP, distance, direction, etc. The MAC may use the additional information and the TDD pattern received from the upper layer for the UE to construct a candidate resource pool. The MAC may determine if a size of the candidate resource pool≥M≥(N+1). If the size of the candidate resource pool is not≥M≥(N+1), a different AD configuration may be selected.

The MAC may determine a candidate resource set based on an RSRP threshold ($\gamma_t$) and an available resources threshold (x). If a size of the candidate resource set<x×a size of an entire resource set for a selection window, the total selected resources may be set to $N_t=0$ and the MAC may determine whether N+1 resources are available for transmission and determine that the condition is: $N_t=1+N$. If enough resources are available for transmission, the MAC may select N+1 resources from the candidate resource set. If N+1 resources are not available for transmission by comparing: $N_t=N+1$, the RSRP threshold may be increased based on a predetermined protocol, such as $\gamma_{t+1} \rightarrow \gamma_t + \Delta$ (dB), and the MAC may again determine the one or more AD configurations/indexes based on the additional information and construct a second candidate resource pool.

Accordingly, rather than selecting the candidate resource pool and setting the RSRP threshold, the MAC may determine/generate the candidate resource pool based on the AD configuration and the additional information, and perform resource selection based on sidelink mode 2 techniques. The UE may implement the first aspect or the second aspect based on a pre-configuration. Thresholds associated with M, $\Delta$, etc., may be indicated in pre-configuration for the UE.

Figure 9:
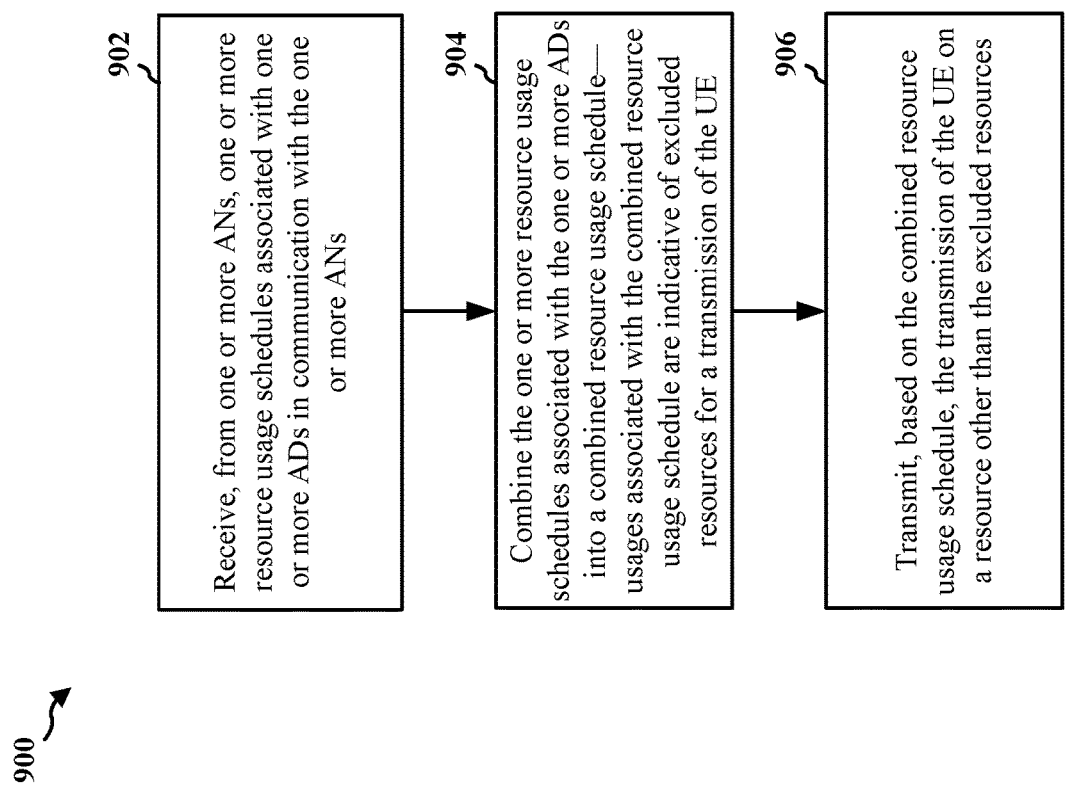
FIG. 9 is a flowchart of a method of wireless communication at a UE.

FIG. 9 is a flowchart 900 of a method of wireless communication. The method may be performed by a UE (e.g., the UE 104, 402, 704a-704e; the apparatus 1302; etc.), which may include the memory 360 and which may be the entire UE 104, 402, 704a-704e or a component of the UE 104, 402, 704a-704e, such as the TX processor 368, the RX processor 356, and/or the controller/processor 359.

At 902, the UE may receive, from one or more ANs, one or more resource usage schedules associated with one or more ADs in communication with the one or more ANs. For example, referring to FIG. 4, the UE 402 may receive at, 406a, AD usage schedule(s) from the AN 404. The UE 402 may also receive, at 406b, AD usage schedule(s) from one or more other ANs included in the network. The reception, at 902, may be performed by the reception component 1330 of the apparatus 1302 in FIG. 13.

At 904, the UE may combine the one or more resource usage schedules associated with the one or more ADs into a combined resource usage schedule—usages associated with the combined resource usage schedule are indicative of excluded resources for a transmission of the UE. For example, referring to FIG. 4, the UE 402 may aggregate, at 408, the AD usage schedule(s) received, at 406a-406b, into a combined AD usage schedule (e.g., indicative of excluded resources for transmissions of the UE 402). The combining, at 904, may be performed by the combination component 1340 of the apparatus 1302 in FIG. 13.

At 906, the UE may transmit, based on the combined resource usage schedule, the transmission of the UE on a resource other than the excluded resources. For example, referring to FIG. 4, the UE 402 may transmit to a sidelink UE 420, at 416a/418a, and/or to the AN 404, at 416b/418b, a transmission or retransmission on selected resources based on the combined AD usage schedule. The transmission, at 906, may be performed by the transmission component 1334 of the apparatus 1302 in FIG. 13.

Figure 10:
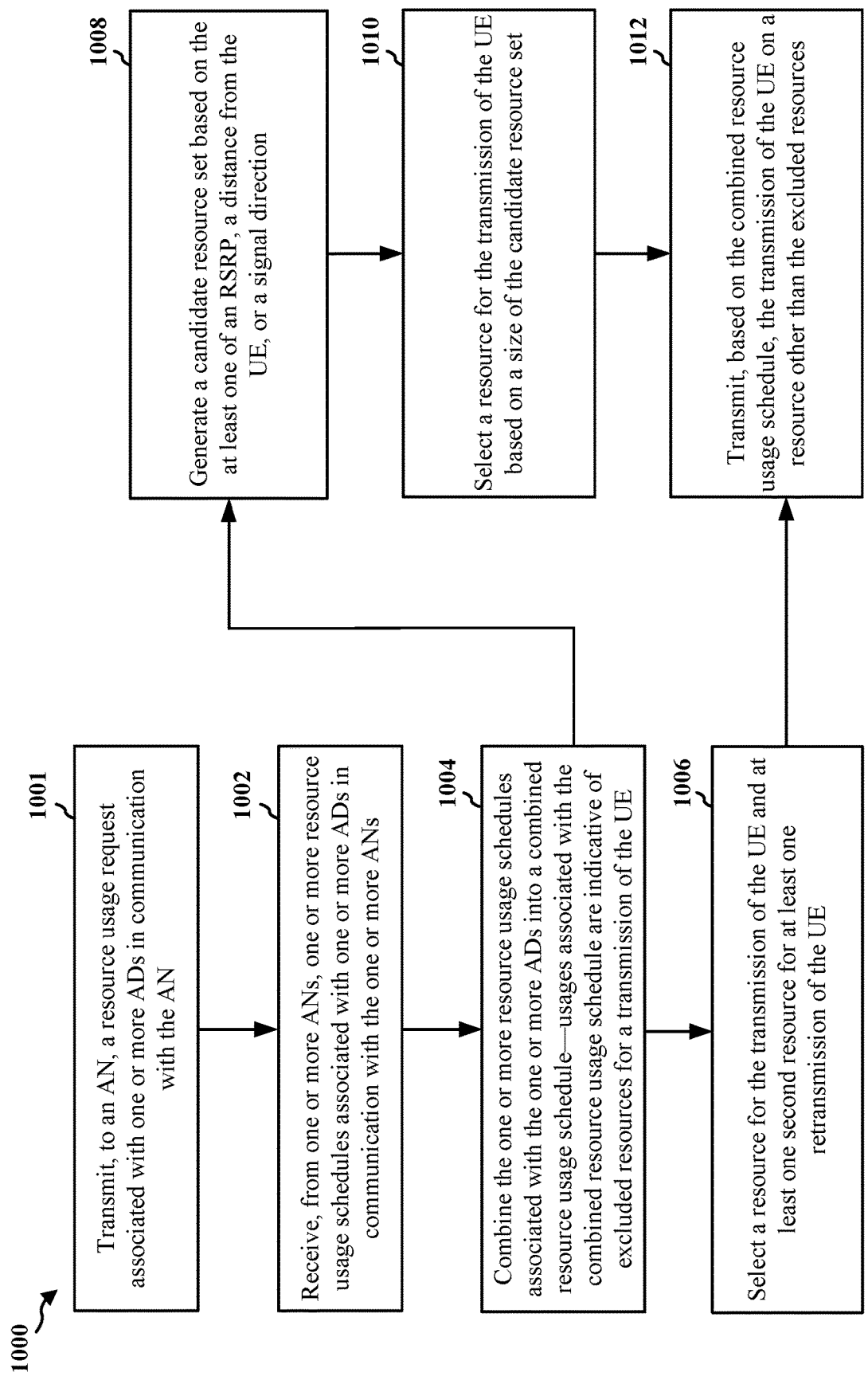
FIG. 10 is a flowchart of a method of wireless communication at a UE.

FIG. 10 is a flowchart 1000 of a method of wireless communication. The method may be performed by a UE (e.g., the UE 104, 402, 704a-704e; the apparatus 1302; etc.), which may include the memory 360 and which may be the entire UE 104, 402, 704a-704e or a component of the UE 104, 402, 704a-704e, such as the TX processor 368, the RX processor 356, and/or the controller/processor 359.

At 1001, the UE may transmit, to an AN, a resource usage request associated with one or more ADs in communication with the AN, where the one or more resource usage schedules may be received based on a resource usage request. For example, referring to FIG. 4, the UE 402 may transmit, at 405a, to AN 404, a resource usage request associated with one or more ADs in communication with the AN, where the one or more resource usage schedules may be received based on a resource usage request. The transmission, at 1001, may be performed by the transmission component 1334 of the apparatus 1302 in FIG. 13.

At 1002, the UE may receive, from one or more ANs, one or more resource usage schedules associated with one or more ADs in communication with the one or more ANs. For example, referring to FIGS. 4 and 8, the UE 402 may receive at, 406a, AD usage schedule(s) from the AN 404. The UE 402 may also receive, at 406b, AD usage schedule(s) from one or more other ANs included in the network. The one or more AD/resource usage schedules received, at 406a-406b, may be indicative of at least one timeframe in which the one or more ADs are active. The one or more AD/resource usage schedules received, at 406a-406b, may be associated with a TDD pattern indicative of at least one of the one or more ADs that are active in the at least one timeframe, as illustrated in the table 800, or a resource selection index associated with the one or more ADs, as illustrated in the table 850. The one or more AD/resource usage schedules may be received, at 406a-406b, a predetermined number of slots before a first slot of the one or more AD/resource usage schedules. The one or more AD/resource usage schedules may be received, at 406a-406b, at an application layer and indicated to a MAC layer via an RRC message, the indication including at least one of direction information or usage information of the one or more ADs. The reception, at 1002, may be performed by the reception component 1330 of the apparatus 1302 in FIG. 13.

At 1004, the UE may combine the one or more resource usage schedules associated with the one or more ADs into a combined resource usage schedule—usages associated with the combined resource usage schedule are indicative of excluded resources for a transmission of the UE. For example, referring to FIG. 4, the UE 402 may aggregate, at 408, the AD usage schedule(s) received, at 406a-406b, into a combined AD usage schedule (e.g., indicative of excluded resources for transmissions of the UE 402). The combined resource usage schedule aggregated, at 408, may be based on at least one of an RSRP, a distance from the UE 402, or a signal direction. The combining, at 1004, may be performed by the combination component 1340 of the apparatus 1302 in FIG. 13.

At 1006, the UE may select a resource for the transmission of the UE and at least one second resource for at least one retransmission of the UE. For example, referring to FIGS. 4 and 8, the UE 402 may select, at 414, transmission (Tx) resource(s) and retransmission (Re-Tx) resource(s) based on the combined AD usage schedule. The resources for the transmission of the UE 402 may be selected from a candidate resource set based on the one or more resource usage schedules received, at 406a-406b, associated with the one or more ADs. The resource for the transmission of the UE 402 may be selected from a candidate resource set based on a resource selection index associated with the one or more ADs (e.g., as illustrated in the table 850). The at least one second resource for the at least one retransmission of the UE 402 may be selected, at 414, if the at least one second resource is available based on the combined resource usage schedule. The at least one second resource for the at least one retransmission of the UE 402 may be removed from the candidate resource set if the at least one second resource selected, at 414, corresponds to the excluded resources of the combined resource usage schedule. The selection, at 1006, may be performed by the selection component 1344 of the apparatus 1302 in FIG. 13.

At 1008, the UE may alternatively generate a candidate resource set based on the at least one of an RSRP, a distance from the UE, or a signal direction. For example, referring to FIG. 4, the UE 402 may generate, at 410, a candidate resource set based on the AD usage schedules received, at 406a-406b. The generation, at 1008, may be performed by the generation component 1342 of the apparatus 1302 in FIG. 13.

At 1010, the UE may select a resource for the transmission of the UE based on a size of the candidate resource set. For example, referring to FIG. 4, the UE 402 may select, at 412, a resource based on a size of the candidate resource set. The selection, at 1010, may be performed by the selection component 1344 of the apparatus 1302 in FIG. 13.

At 1012, the UE may transmit, based on the combined resource usage schedule, the transmission of the UE on a resource other than the excluded resources. For example, referring to FIG. 4, the UE 402 may transmit to a sidelink UE 420, at 416a/418a, and/or to the AN 404, at 416b/418b, a transmission or retransmission on selected resources based on the combined AD usage schedule. The transmission, at 1012, may be performed by the transmission component 1334 of the apparatus 1302 in FIG. 13.

Figure 11:
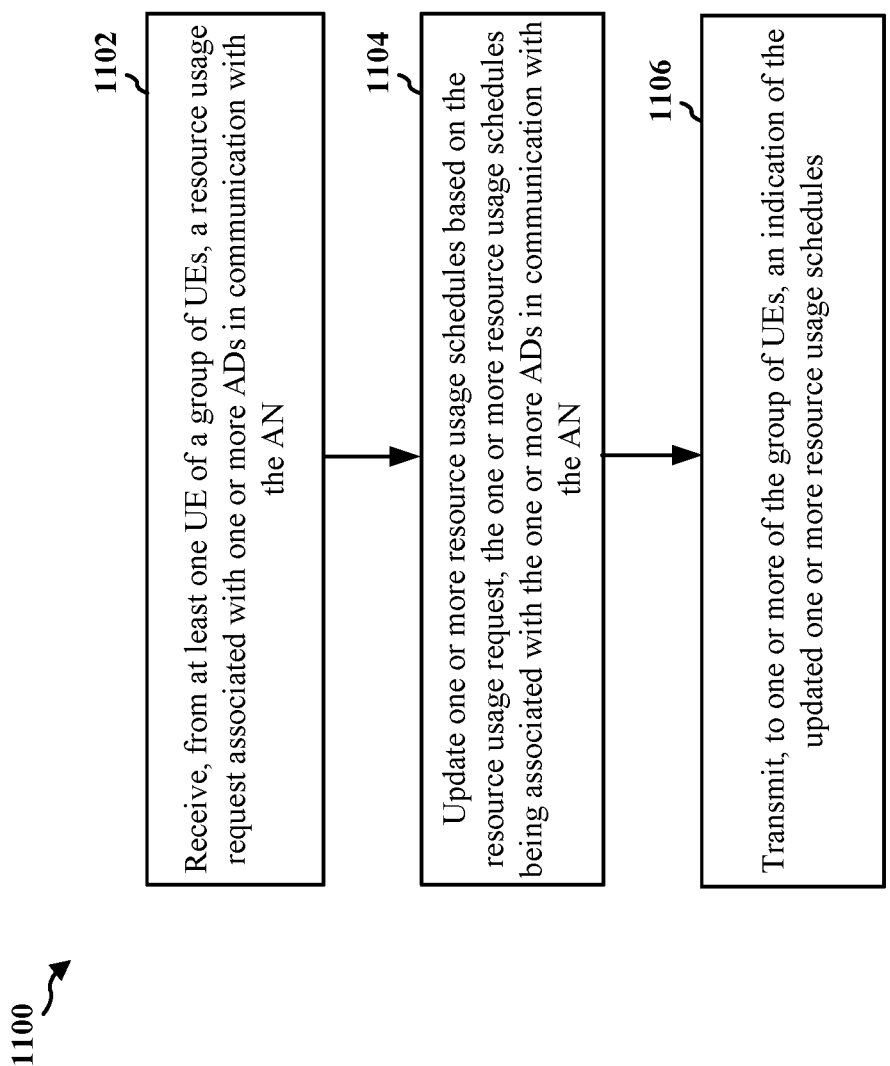
FIG. 11 is a flowchart of a method of wireless communication at an AN.

FIG. 11 is a flowchart 1100 of a method of wireless communication. The method may be performed by an AN (e.g., the AN 191, 404, 604; the apparatus 1402; etc.), which may include the memory 376 and which may be the entire AN 191, 404, 604 or a component of the AN 191, 404, 604, such as the TX processor 316, the RX processor 370, and/or the controller/processor 375.

At 1102, the AN may receive, from at least one user equipment (UE) of a group of UEs, a resource usage request associated with one or more assisting devices (ADs) in communication with the AN. For example, referring to FIG. 4, the AN 404 may receive, at 405a, from UE 402 of a group of UEs, a resource usage request associated with one or more ADs in communication with the AN. The reception, at 1102, may be performed by the reception component 1430 of the apparatus 1402 in FIG. 14.

At 1104, the AN may update one or more resource usage schedules based on the resource usage request, the one or more resource usage schedules being associated with the one or more ADs in communication with the AN. For example, referring to FIG. 4, the AN 404 may update, at 405*b*, one or more resource usage schedules based on the resource usage request, the one or more resource usage schedules being associated with the one or more ADs in communication with the AN. The update, at 1104, may be performed by the update component 1444 of the apparatus 1402 in FIG. 14.

At 1106, the AN may transmit, to one or more of the group of UEs, an indication of the updated one or more resource usage schedules. For example, referring to FIG. 4, the AN 404 may transmit, at 406*a*, to one or more of the group of UEs, an indication of the updated one or more resource usage schedules. The transmission, at 1106, may be performed by the Tx AD schedule component 1440 of the apparatus 1402 in FIG. 14.

Figure 12:
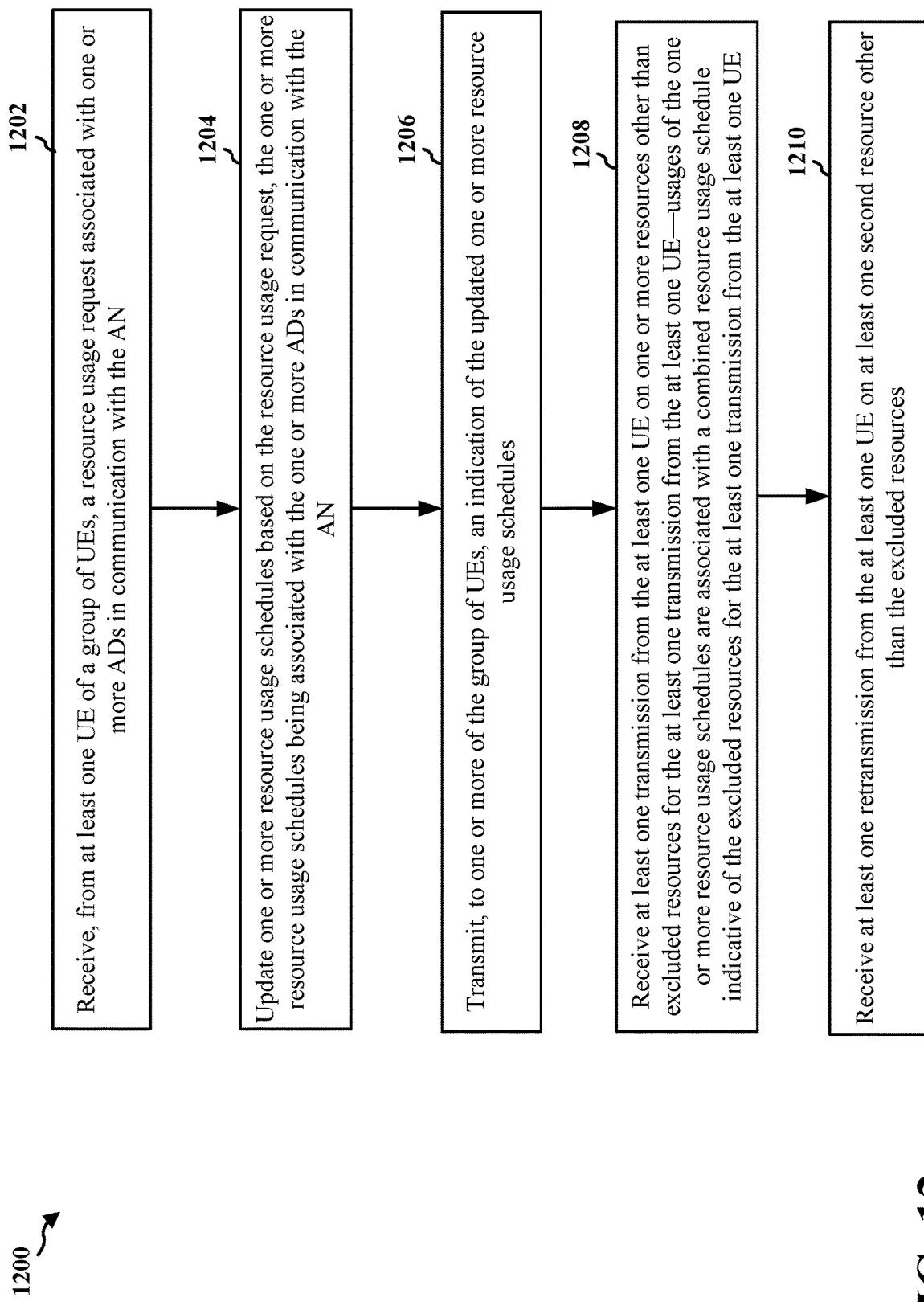
FIG. 12 is a flowchart of a method of wireless communication at an AN.

FIG. 12 is a flowchart 1200 of a method of wireless communication. The method may be performed by an AN (e.g., the AN 191, 404, 604; the apparatus 1402; etc.), which may include the memory 376 and which may be the entire AN 191, 404, 604 or a component of the AN 191, 404, 604, such as the TX processor 316, the RX processor 370, and/or the controller/processor 375.

At 1202, the AN may receive, from at least one user equipment (UE) of a group of UEs, a resource usage request associated with one or more assisting devices (ADs) in communication with the AN. For example, referring to FIG. 4, the AN 404 may receive, at 405*a* from UE 402 of a group of UEs, a resource usage request associated with one or more ADs in communication with the AN. The reception, at 1202, may be performed by the reception component 1430 of the apparatus 1402 in FIG. 14.

At 1204, the AN may update one or more resource usage schedules based on the resource usage request, the one or more resource usage schedules being associated with the one or more ADs in communication with the AN. For example, referring to FIG. 4, the AN 404 may update, at 405*b*, one or more resource usage schedules based on the resource usage request, the one or more resource usage schedules being associated with the one or more ADs in communication with the AN. The update, at 1204, may be performed by the update component 1444 of the apparatus 1402 in FIG. 14.

At 1206, the AN may transmit, to one or more of the group of UEs, an indication of the updated one or more resource usage schedules. For example, referring to FIG. 4, the AN 404 may transmit, at 406*a*, to one or more of the group of UEs, an indication of the updated one or more resource usage schedules. The transmission, at 1206, may be performed by the Tx AD schedule component 1440 of the apparatus 1402 in FIG. 14. The AN may also transmit, at 406*c*, AD usage schedule(s) to other UEs in the network, such as the sidelink UE 420. The one or more AD/resource usage schedules transmitted, at 406*a* and 406*c*, may be indicative of at least one timeframe in which the one or more ADs are active. The one or more AD/resource usage schedules transmitted, at 406*a* and 406*c*, may be associated with a TDD pattern indicative of at least one of the one or more ADs that are active in the at least one timeframe, as illustrated in the table 800, or a resource selection index associated with the one or more ADs, as illustrated in the table 850. The one or more AD/resource usage schedules may be transmitted, at 406*a* and 406*c*, a predetermined number of slots before a first slot of the one or more AD/resource usage schedules. The one or more AD/resource usage schedules may be transmitted, at 406*a* and 406*c*, to an application layer and may be associated with at least one of direction information or usage information of the one or more ADs.

At 1208, the AN may receive at least one transmission from the at least one UE on one or more resources other than excluded resources for the at least one transmission from the at least one UE—usages of the one or more resource usage schedules are associated with a combined resource usage schedule indicative of the excluded resources for the at least one transmission from the at least one UE. For example, referring to FIG. 4, the AN 404 may receive, at 416*b*/418*b*, a transmission on Tx resource(s) from the UE 402 and/or other UEs in the network, such as the sidelink UE 420. The Tx resource(s) may be based on a combined AD usage schedule aggregated from a plurality of ANs that include the AN 404. The combined resource usage schedule may be based on at least one of an RSRP, a distance from the UE 402/sidelink UE 420, or a signal direction. The at least one transmission received, at 416*b*/418*b*, from the at least one UE (e.g., the UE 402 and/or the sidelink UE 420) may be based on a size of a candidate resource set. The reception, at 1208, may be performed by the Rx AD schedule component 1442 of the apparatus 1402 in FIG. 14.

At 1210, the AN may receive at least one retransmission from the at least one UE on at least one second resource other than the excluded resources. For example, referring to FIGS. 4 and 8, the AN 404 may receive, at 416*b*/418*b*, a retransmission on Re-Tx resource(s) from the UE 402 and/or other UEs in the network, such as the sidelink UE 420. The Re-Tx resource(s) may be based on the combined AD usage schedule aggregated from the plurality of ANs that include the AN 404. The one or more resources for the at least one transmission of the at least one UE (e.g., UE 402) may correspond to a candidate resource set based on the one or more resource usage schedules transmitted, at 406*a* and 406*c*, associated with the one or more ADs. The one or more resources for the at least one transmission of the at least one UE (e.g., UE 402) may correspond to a candidate resource set based on a resource selection index associated with the one or more ADs (e.g., as illustrated in the table 850). The at least one second resource for the at least one retransmission of the UE 402 may be selected if the at least one second resource is available based on the combined resource usage schedule. The at least one second resource for the at least one retransmission of the UE 402 may be removed from the candidate resource set if the at least one second resource corresponds to the excluded resources of the combined resource usage schedule. The reception, at 1210, may be performed by the Rx AD schedule component 1442 of the apparatus 1402 in FIG. 14.

Figure 13:
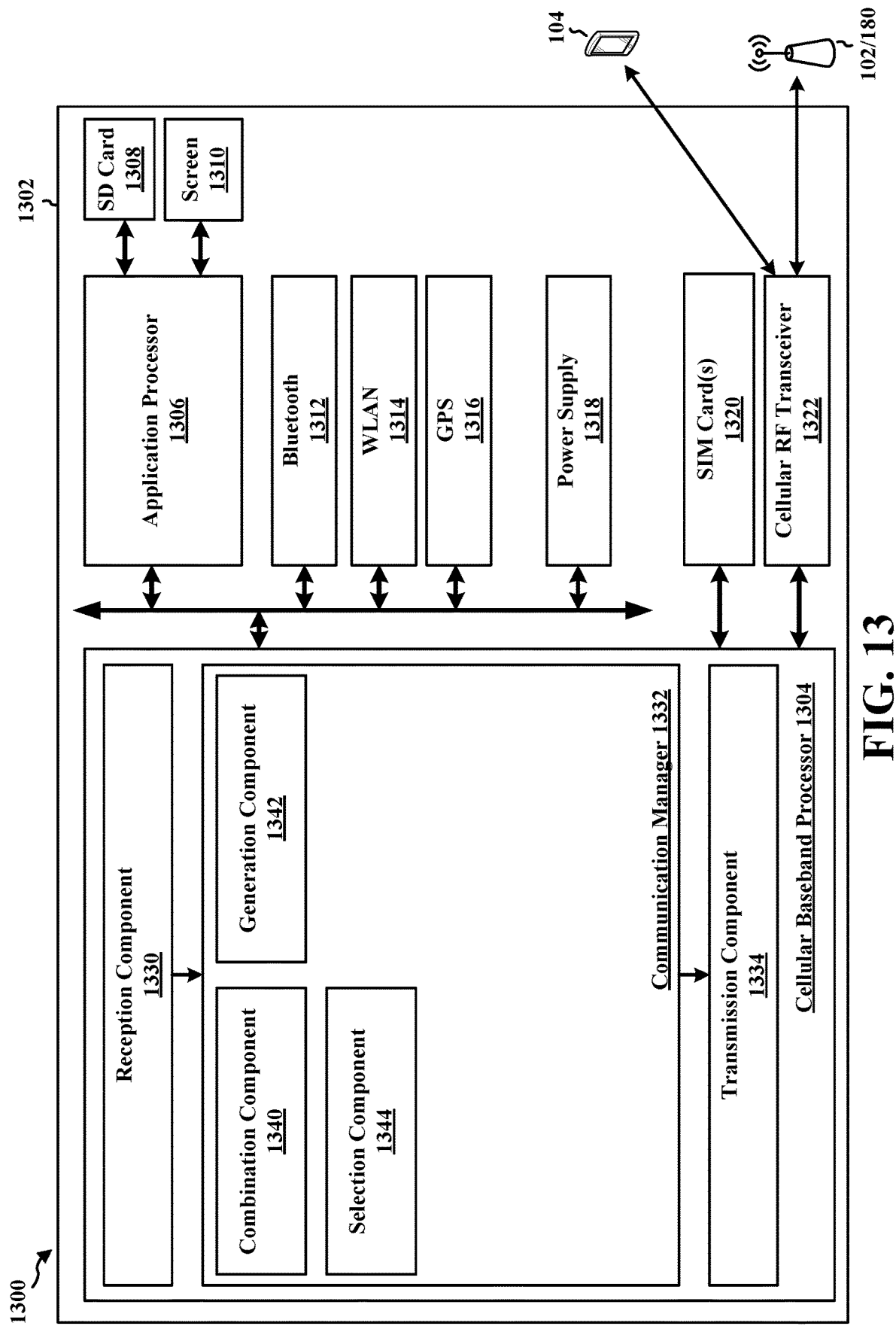
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The transmission component 1334 is configured, e.g., as described in connection with 1001, to transmit, to an AN, a resource usage request associated with one or more ADs in communication with the AN, where the one or more resource usage schedules may be received based on a resource usage request. The reception component 1330 is configured, e.g., as described in connection with 902 and 1002, to receive, from one or more ANs, one or more resource usage schedules associated with one or more ADs in communication with the one or more ANs. The communication manager 1332 includes a combination component 1340 that is configured, e.g., as described in connection with 904 and 1004, to combine the one or more resource usage schedules associated with the one or more ADs into a combined resource usage schedule—usages associated with the combined resource usage schedule are indicative of excluded resources for a transmission of the UE. The communication manager 1332 further includes a generation component 1342 that is configured, e.g., as described in connection with 1008, to generate a candidate resource set based on the at least one of an RSRP, a distance from the UE, or a signal direction. The communication manager 1332 further includes a selection component 1344 that is configured, e.g., as described in connection with 1006 and 1010, to select a resource for the transmission of the UE and at least one second resource for at least one retransmission of the UE; and to select a resource for the transmission of the UE based on a size of the candidate resource set. The transmission component 1334 is configured, e.g., as described in connection with 906 and 1012, to transmit, based on the combined resource usage schedule, the transmission of the UE on a resource other than the excluded resources.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for transmitting, to an AN, a resource usage request associated with one or more ADs in communication with the AN, where the one or more resource usage schedules may be received based on a resource usage request; means for receiving, from one or more ANs, one or more resource usage schedules associated with one or more ADs in communication with the one or more ANs; means for combining the one or more resource usage schedules associated with the one or more ADs into a combined resource usage schedule, usages associated with the combined resource usage schedule indicative of excluded resources for a transmission of the UE; and means for transmitting, based on the combined resource usage schedule, the transmission of the UE on a resource other than the excluded resources. The apparatus 1302 further includes means for selecting the resource for the transmission of the UE and at least one second resource for at least one retransmission of the UE. The apparatus 1302 further includes means for generating a candidate resource set based on the at least one of the RSRP, the distance from the UE, or the signal direction. The apparatus 1302 further includes means for selecting the resource for the transmission of the UE based on a size of the candidate resource set.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
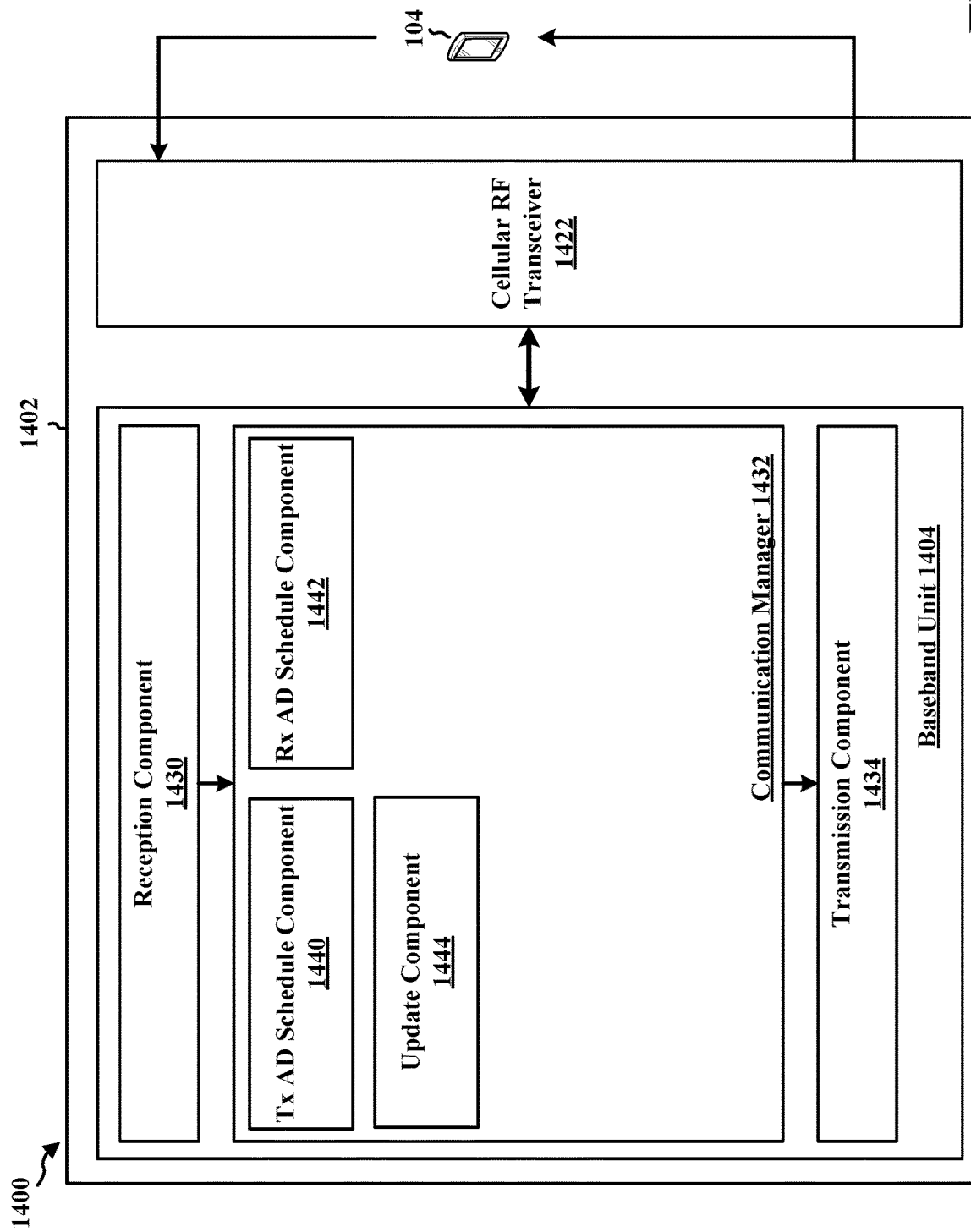
FIG. 14 is a diagram illustrating an example of a hardware implementation for an example apparatus.

FIG. 14 is a diagram 1400 illustrating an example of a hardware implementation for an apparatus 1402. The apparatus 1402 may be an AN, a component of an AN, or may implement AN functionality. In some aspects, the apparatus 1302 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the AN 310 and may include the memory 376 and/or at least one of the TX processor 316, the RX processor 370, and the controller/processor 375.

The reception component 1430 is configured, e.g., as described in connection with 1102 and 1202, to receive, from at least one UE of a group of UEs, a resource usage request associated with one or more assisting devices (ADs) in communication with the AN. The communication manager 1432 includes an update component 1444 that is configured, e.g., as described in connection with 1104 and 1204, to update one or more resource usage schedules based on the resource usage request, the one or more resource usage schedules being associated with the one or more ADs in communication with the AN. The communication manager 1432 includes a Tx AD schedule component 1440 that is configured, e.g., as described in connection with 1106 and 1206, to transmit, to one or more of the group of UEs, an indication of the updated one or more resource usage schedules. The communication manager 1432 further includes an Rx AD schedule component 1442 that is configured, e.g., as described in connection with 1208 and 1210, to receive at least one transmission from the at least one UE on one or more resources other than excluded resources for the at least one transmission from the at least one UE— usages of the one or more resource usage schedules are associated with a combined resource usage schedule indicative of the excluded resources for the at least one transmission from the at least one UE; and to receive at least one retransmission from the at least one UE on at least one second resource other than the excluded resources The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving, from at least one user equipment (UE) of a group of UEs, a resource usage request associated with one or more assisting devices (ADs) in communication with the AN; means for updating one or more resource usage schedules based on the resource usage request, the one or more resource usage schedules being associated with the one or more ADs in communication with the AN; means for transmitting, to one or more of the group of UEs, an indication of the updated one or more resource usage schedules; and means for receiving at least one transmission from the at least one UE on one or more resources other than excluded resources for the at least one transmission from the at least one UE, usages of the one or more resource usage schedules associated with a combined resource usage schedule indicative of the excluded resources for the at least one transmission from the at least one UE. The apparatus 1402 further includes means for receiving at least one retransmission from the at least one UE on at least one second resource other than the excluded resources.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from one or more ANs, one or more resource usage schedules associated with one or more ADs in communication with the one or more ANs; combine the one or more resource usage schedules associated with the one or more ADs into a combined resource usage schedule, usages associated with the combined resource usage schedule indicative of excluded resources for a transmission of the UE; and transmit, based on the combined resource usage schedule, the transmission of the UE on a resource other than the excluded resources.

Aspect 2 may be combined with aspect 1 and includes that the one or more resource usage schedules are indicative of at least one timeframe in which the one or more ADs are active.

Aspect 3 may be combined with any of aspects 1-2 and includes that the one or more resource usage schedules are associated with a TDD pattern indicative of at least one of the one or more ADs that are active in the at least one timeframe or a resource selection index associated with the one or more ADs.

Aspect 4 may be combined with any of aspects 1-3 and includes that the one or more resource usage schedules are received a predetermined number of slots before a first slot of the one or more resource usage schedules.

Aspect 5 may be combined with any of aspects 1-4 and includes that the one or more resource usage schedules are received at an application layer and indicated to a MAC layer via an RRC message, the indication including at least one of direction information or usage information of the one or more ADs.

Aspect 6 may be combined with any of aspects 1-5 and includes that the at least one processor is further configured to select the resource for the transmission of the UE and at least one second resource for at least one retransmission of the UE.

Aspect 7 may be combined with any of aspects 1-6 and includes that the resource for the transmission of the UE is selected from a candidate resource set based on the one or more resource usage schedules associated with the one or more ADs.

Aspect 8 may be combined with any of aspects 1-7 and includes that the resource for the transmission of the UE is selected from a candidate resource set based on a resource selection index associated with the one or more ADs.

Aspect 9 may be combined with any of aspects 1-8 and includes that the at least one second resource for the at least one retransmission of the UE is selected if the at least one second resource is available based on the combined resource usage schedule.

Aspect 10 may be combined with any of aspects 1-9 and includes that the at least one second resource for the at least one retransmission of the UE is removed from the candidate resource set if the at least one second resource corresponds to the excluded resources of the combined resource usage schedule.

Aspect 11 may be combined with any of aspects 1-5 and includes that the combined resource usage schedule is based on at least one of a reference signal received power (RSRP), a distance from the UE, or a signal direction.

Aspect 12 may be combined with any of aspects 1-5 or 11 and includes that the at least one processor is further configured to generate a candidate resource set based on the at least one of the RSRP, the distance from the UE, or the signal direction.

Aspect 13 may be combined with any of aspects 1-5 or 11-12 and includes that the at least one processor is further configured to select the resource for the transmission of the UE based on a size of the candidate resource set.

Aspect 14 may be combined with any of aspects 1-13 and further includes at least one of an antenna or a transceiver coupled to the at least one processor, where the at least one processor is further configured to: transmit, to the AN, a resource usage request associated with the one or more ADs in communication with the AN, where the one or more resource usage schedules are received based on the resource usage request.

Aspect 15 is an apparatus for wireless communication at an AN including at least one processor coupled to a memory and configured to receive, from at least one user equipment (UE) of a group of UEs, a resource usage request associated with one or more assisting devices (ADs) in communication with the AN; update one or more resource usage schedules based on the resource usage request, the one or more resource usage schedules being associated with the one or more ADs in communication with the AN; and transmit, to one or more of the group of UEs, an indication of the updated one or more resource usage schedules.

Aspect 16 may be combined with aspect 15 and includes that the one or more resource usage schedules are indicative of at least one timeframe in which the one or more ADs are active.

Aspect 17 may be combined with any of aspects 15-16 and includes that the one or more resource usage schedules are associated with a TDD pattern indicative of at least one of the one or more ADs that are active in the at least one timeframe or a resource selection index associated with the one or more ADs.

Aspect 18 may be combined with any of aspects 15-17 and includes that the one or more resource usage schedules are transmitted a predetermined number of slots before a first slot of the one or more resource usage schedules.

Aspect 19 may be combined with any of aspects 15-18 and includes that the one or more resource usage schedules are transmitted to an application layer and are associated with at least one of direction information or usage information of the one or more ADs.

Aspect 20 may be combined with any of aspects 15-19 and includes that the at least one processor is further configured to receive at least one transmission from the at least one UE on one or more resources other than excluded resources for the at least one transmission from the at least one UE, where usages of the one or more resource usage schedules associated with a combined resource usage schedule are indicative of the excluded resources for the at least one transmission from the at least one UE.

Aspect 21 may be combined with any of aspects 15-20 and includes that the at least one processor is further configured to receive at least one retransmission from the at least one UE on at least one second resource other than the excluded resources.

Aspect 22 may be combined with any of aspects 15-21 and includes that the one or more resources for the at least one transmission of the at least one UE correspond to a candidate resource set based on the one or more resource usage schedules associated with the one or more ADs.

Aspect 23 may be combined with any of aspects 15-22 and includes that the one or more resources for the at least one transmission of the at least one UE correspond to a candidate resource set based on a resource selection index associated with the one or more ADs.

Aspect 24 may be combined with any of aspects 15-23 and includes that the at least one second resource for the at least one retransmission of the UE is selected if the at least one second resource is available based on the combined resource usage schedule.

Aspect 25 may be combined with any of aspects 15-24 and includes that the at least one second resource for the at least one retransmission of the UE is removed from the candidate resource set if the at least one second resource corresponds to the excluded resources of the combined resource usage schedule.

Aspect 26 may be combined with any of aspects 15-20 and includes that the combined resource usage schedule is based on at least one of an RSRP, a distance from the UE, or a signal direction.

Aspect 27 may be combined with any of aspects 15-20 or 26 and includes that reception of the at least one transmission from the at least one UE is based on a size of a candidate resource set.

Aspect 28 may be combined with any of aspects 15-27 and further includes at least one of an antenna or a transceiver coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for wireless communication at a user equipment (UE), comprising:
   a processing system that includes processor circuits and memory that stores code, the processing system configured to cause the UE to:
   receive, from one or more assisting nodes (ANs), one or more resource usage schedules associated with one or more assisting devices (ADs) controlled by the one or more ANs, wherein the one or more ADs include at least one of a relay, a repeater, a reconfigurable intelligence surface (RIS), or a meta-surface;
   combine the one or more resource usage schedules associated with the one or more ADs into a combined resource usage schedule, usages associated with the combined resource usage schedule indicative of excluded resources for a transmission of the UE; and
   transmit, based on the combined resource usage schedule, the transmission of the UE on a resource other than the excluded resources.

2. The apparatus of claim 1, wherein the one or more resource usage schedules are indicative of at least one timeframe in which the one or more ADs are active.

3. The apparatus of claim 2, wherein the one or more resource usage schedules are associated with a time division duplex (TDD) pattern indicative of at least one of the one or more ADs that are active in the at least one timeframe or a resource selection index associated with the one or more ADs.

4. The apparatus of claim 1, wherein to receive the one or more resource usage schedules, the processing system is configured to cause the UE to receive the one or more resource usage schedules a predetermined number of slots before a first slot of the one or more resource usage schedules.

5. The apparatus of claim 1, wherein to receive the one or more resource usage schedules, the processing system is configured to cause the UE to receive the one or more resource usage schedules at an application layer and indicate the one or more resource usage schedules to a medium access control (MAC) layer via a radio resource control (RRC) message, the indication including at least one of direction information or usage information of the one or more ADs.

6. The apparatus of claim 1, wherein the processing system is further configured to cause the UE to select the resource for the transmission of the UE and at least one second resource for at least one retransmission of the UE.

7. The apparatus of claim 6, wherein to select the resource for the transmission of the UE, the processing system is configured to cause the UE to select the resource for the transmission from a candidate resource set based on the one or more resource usage schedules associated with the one or more ADs.

8. The apparatus of claim 6, wherein to select the resource for the transmission of the UE, the processing system is configured to cause the UE to select the resource for the transmission from a candidate resource set based on a resource selection index associated with the one or more ADs.

9. The apparatus of claim 8, wherein to select the at least one second resource for the at least one retransmission of the UE, the processing system is configured to cause the UE to select the at least one second resource for the at least one transmission of the UE if the at least one second resource is available based on the combined resource usage schedule.

10. The apparatus of claim 8, wherein the at least one second resource for the at least one retransmission of the UE is removed from the candidate resource set if the at least one second resource corresponds to the excluded resources of the combined resource usage schedule.

11. The apparatus of claim 1, wherein the combined resource usage schedule is based on at least one of a reference signal received power (RSRP), a distance from the UE, or a signal direction.

12. The apparatus of claim 11, wherein the processing system is further configured to cause the UE to generate a candidate resource set based on the at least one of the RSRP, the distance from the UE, or the signal direction.

13. The apparatus of claim 12, wherein the processing system is further configured to cause the UE to select the resource for the transmission of the UE based on a size of the candidate resource set.

14. The apparatus of claim 1, further comprising at least one of an antenna or a transceiver coupled to the processing system, wherein the processing system is further configured to cause the UE to:
   transmit, to the one or more ANs, a resource usage request associated with the one or more ADs wherein to receive the one or more resource usage schedules, the processing system is configured to cause the UE to receive the one or more resource usage schedules based on the resource usage request.

15. An apparatus for wireless communication at an assisting node (AN), comprising:
   a processing system that includes processor circuits and memory that stores code, the processing system configured to cause the AN to:
   receive, from at least one user equipment (UE) of a group of UEs, a resource usage request associated with one or more assisting devices (ADs) controlled by the AN, wherein the one or more ADs include at least one of a relay, a repeater, a reconfigurable intelligence surface (RIS), or a meta-surface;
   update one or more resource usage schedules based on the resource usage request, the one or more resource usage schedules being associated with the one or more; and
   transmit, to one or more UEs of the group of UEs, the one or more resource usage schedules.

16. The apparatus of claim 15, wherein the one or more resource usage schedules are indicative of at least one timeframe in which the one or more ADs are active.

17. The apparatus of claim 16, wherein the one or more resource usage schedules are associated with a time division duplex (TDD) pattern indicative of at least one of the one or more ADs that are active in the at least one timeframe or a resource selection index associated with the one or more ADs.

18. The apparatus of claim 15, wherein to transmit the one or more resource usage schedules, the processing system is configured to cause the AN to transmit the one or more resource usage schedules a predetermined number of slots before a first slot of the one or more resource usage schedules.

19. The apparatus of claim 15, wherein to transmit the one or more resource usage schedules, the processing system is configured to cause the AN to transmit the one or more resource usage schedules to an application layer and are associated with at least one of direction information or usage information of the one or more ADs.

20. The apparatus of claim 15, wherein the processing system is further configured to cause the AN to:
receive at least one transmission from the at least one UE on one or more resources other than excluded resources for the at least one transmission from the at least one UE, wherein usages of the one or more resource usage schedules associated with a combined resource usage schedule are indicative of the excluded resources for the at least one transmission from the at least one UE.

21. The apparatus of claim 20, wherein the processing system is further configured to cause the AN to receive at least one retransmission from the at least one UE on at least one second resource other than the excluded resources.

22. The apparatus of claim 21, wherein the one or more resources for the at least one transmission of the at least one UE correspond to a candidate resource set based on the one or more resource usage schedules associated with the one or more ADs.

23. The apparatus of claim 21, wherein the one or more resources for the at least one transmission of the at least one UE correspond to a candidate resource set based on a resource selection index associated with the one or more ADs.

24. The apparatus of claim 23, wherein the at least one second resource for the at least one retransmission of the UE is selected if the at least one second resource is available based on the combined resource usage schedule.

25. The apparatus of claim 23, wherein the at least one second resource for the at least one retransmission of the UE is removed from the candidate resource set if the at least one second resource corresponds to the excluded resources of the combined resource usage schedule.

26. The apparatus of claim 20, wherein the combined resource usage schedule is based on at least one of a reference signal received power (RSRP), a distance from the UE, or a signal direction.

27. The apparatus of claim 26, wherein reception of the at least one transmission from the at least one UE is based on a size of a candidate resource set.

28. The apparatus of claim 15, further comprising at least one of an antenna or a transceiver coupled to the processing system.

29. A method of wireless communication at a user equipment (UE), comprising:
receiving, from one or more assisting nodes (ANs), one or more resource usage schedules associated with one or more assisting devices (ADs) controlled by the one or more ANs, wherein the one or more ADs include at least one of a relay, a repeater, a reconfigurable intelligence surface (RIS), or a meta-surface;
combining the one or more resource usage schedules associated with the one or more ADs into a combined resource usage schedule, usages associated with the combined resource usage schedule indicative of excluded resources for a transmission of the UE; and
transmitting, based on the combined resource usage schedule, the transmission of the UE on a resource other than the excluded resources.

30. A method of wireless communication at an assisting node (AN), comprising:
receiving, from at least one user equipment (UE) of a group of UEs, a resource usage request associated with one or more assisting devices (ADs) controlled by the AN, wherein the one or more ADs include at least one of a relay, a repeater, a reconfigurable intelligence surface (RIS), or a meta-surface;
updating one or more resource usage schedules based on the resource usage request, the one or more resource usage schedules being associated with the one or more ADs in communication with the AN; and
transmitting, to one or more of the group of UEs, the one or more resource usage schedules.

* * * * *